United States Patent [19]
Kilcullen

[11] 3,709,515
[45] Jan. 9, 1973

[54] OCCUPANT PROPELLED COASTER

[76] Inventor: Robert Kilcullen, 75 Osborne Lane, New Canaan, Conn. 06840

[22] Filed: Jan. 13, 1971

[21] Appl. No.: 106,246

Related U.S. Application Data

[63] Continuation of Ser. No. 839,405, July 7, 1969, abandoned.

[52] U.S. Cl. ...........................................280/87.02 W
[51] Int. Cl. .............................................B62b 11/00
[58] Field of Search ........280/7.1, 87.02 R, 87.02 W, 280/87.03, 87.05

[56] References Cited

UNITED STATES PATENTS

| | | |
|---|---|---|
| 1,344,023 | 6/1920 | Cantrell...............................280/7.1 |
| 1,367,525 | 2/1921 | Foans..................................280/7.1 |
| 1,479,020 | 1/1924 | Ziemss................................280/7.1 |
| 2,222,678 | 11/1940 | Mittleburg....................280/87.05 X |
| 2,530,544 | 11/1950 | Schwantes..................280/87.02 W |
| 3,109,667 | 11/1963 | Wolner.........................280/87.02 R |

*Primary Examiner*—Leo Friaglia
*Attorney*—John E. Lynch

[57] ABSTRACT

Occupant propelled coaster having a wheeled base and a seat and handle rigidly attached thereto. The rear portion of the seat is set in from the rear of the base and the handle is adapted to serve as a back rest and the portion of the base extending beyond the seat is adapted to serve as a foot rest for a child seated backwards on the coaster. A semi-enclosed storage space between the base and seat is also provided.

6 Claims, 4 Drawing Figures

PATENTED JAN 9 1973
3,709,515
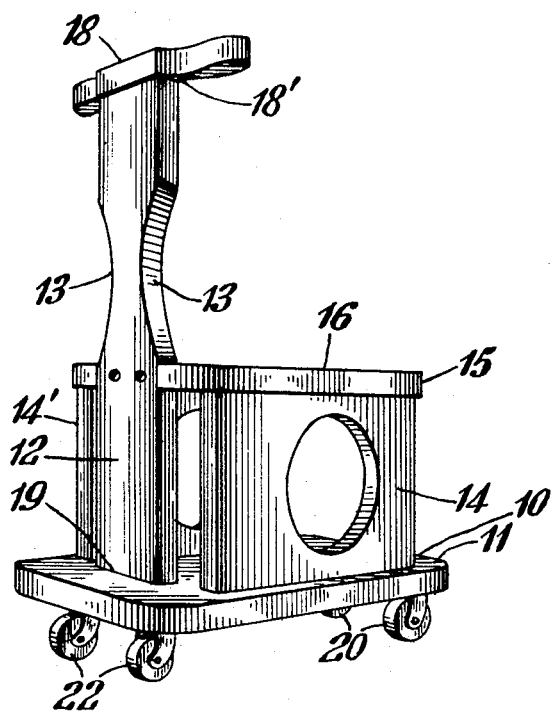
Fig.1.
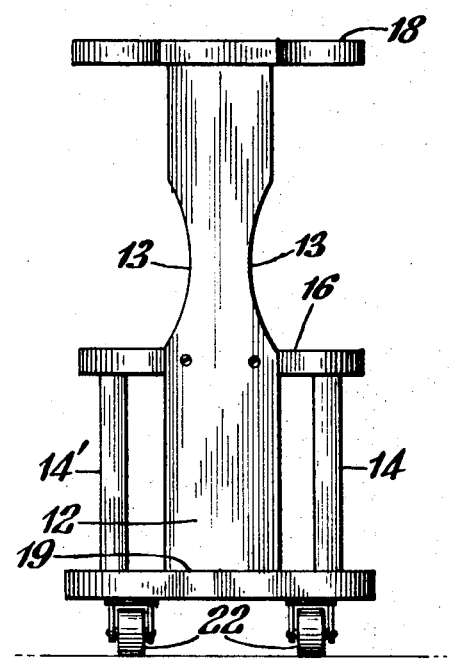
Fig.2.
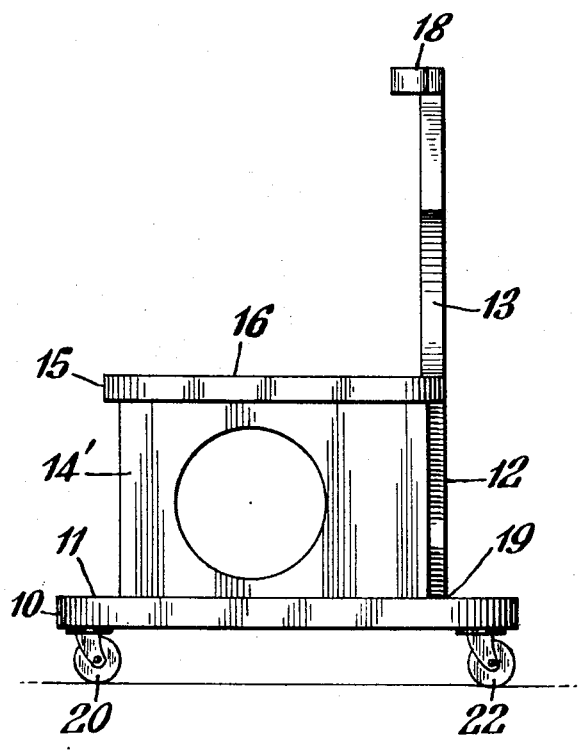
Fig.3.
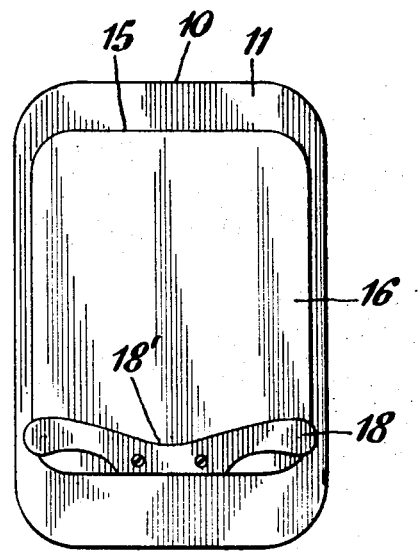
Fig.4.
INVENTOR
ROBERT KILCULLEN
ATTORNEY

OCCUPANT PROPELLED COASTER

This application is a continuation of copending application Ser. No. 839,405, filed July 7, 1969 and now abandoned.

BACKGROUND

This invention relates to an occupant propelled coaster for infants and children which is anti-tipping and is adapted to serve as a seat for an infant or child with means to avoid movement of the coaster when being used as a seat.

SUMMARY

The coaster of this invention includes wheeled base means having rear and forward wheel means and seat means spaced above and rigidly attached to the base. The rear portion of the seat is spaced approximately forward of the rear wheel means and the coaster is provided with handle means extending above the seat means and spaced approximately rearward of the forward wheel means and rigidly attached to the base and the forward portion of the seat.

DESCRIPTION OF THE DRAWING

The accompanying drawing shows a preferred embodiment of this invention wherein:

FIG. 1 is a perspective view of the coaster of this invention;

FIG. 2 is a front view of the coaster of FIG. 1;

FIG. 3 is a side view, of the coaster of FIG. 1; and

FIG. 4 is a top plan view of the coaster of FIG. 1.

DESCRIPTION

As shown in the drawing, a preferred coaster of this invention includes a base member 10 having a pair of rear swivel wheels 20 spaced apart and a pair of forward swivel wheels 22 spaced apart. Spaced above the base 10 is a seat 16 which is secured to the base 10 by two spaced apart vertical members 14 and 14'. Extending above the seat 16 is an upright handle 12 which is secured to the base 10 at 19 and the front of the seat 16 and is topped by a horizontal member 18.

The coaster of this invention is anti-tipping by virtue of the rear edge 15 of seat 16 being approximately forward of the rear wheels 20 and the handle 12 being secured to the base 10 at 19 rearward of the front wheels 22. This construction in conjunction with the stabilizing effect of the legs and feet of an occupant in contact with the ground at the sides of the coaster provide for a stable, more safe coaster for infants and children.

The vertical members 14 and 14' are preferred since they provide a semi-enclosed storage area between the base 10, the seat 16 and the handle 12 for carrying toys and the like. Also preferred are openings (such as the circular holes shown in the drawing) in the vertical members 14 and 14' to tempt infants and children to put various articles through them into the storage area.

The length of the vertical members 14 and 14' can vary greatly as can the size and shape of the openings therein which can be the same or different. The vertical members can be solid if desired and can also be replaced by a single support located at the rear of seat 16 or centrally thereof.

The handle 12 in a preferred embodiment is shown with concave portions 13 which provide for less interference with the legs and knees of an occupant.

The handle 12 is relatively high in comparison to the height of the seat 16 and is adapted to serve as a backrest for an occupant seated backward on the coaster. The preferred shape of the horizontal member 18 as shown is adapted to function as handle bars for an occupant seated facing forward and is curved at 18' to receive the back of an occupant seated backward. The height of the vertical member 18 is chosen to provide maximum support and comfort to an occupant seated backwards.

The base 10 has a portion 11 which extends beyond the rear edge 15 of the seat 16 to provide a foot rest for an occupant seated backwards and thus avoids movement of the coaster when an occupant is seated backwards which would otherwise result from contact with the ground by the occupant's feet.

If desired, three or two wheels can be used for the coaster in place of the four wheels shown. Also the width of the handle 12 and the shape of the vertical member 18 can be varied widely from that shown without departing from the spirit and scope of this invention. The same holds true for the size and shape of the base 10 and the seat 16.

In a preferred embodiment, the openings in the vertical members 14 and 14' are set off-center towards the rear of the coaster as is shown in FIG. 3. This embodiment provides good balance between the capacity of the storage area between the base 10 and the seat 16 and the access thereto through the openings in the vertical members 14 and 14'.

The seat 16 is as shown in FIG. 2 extends over the vertical members 14 and 14'. An occupant can then grasp the edges of the seat 16 seated backwards should he desire to push the coaster with his feet. Also, it should be pointed out that for coasting, an occupant seated facing forward can place his feet on the portion of the base 10 forward of the handle 12.

What is claimed is:

1. Occupant propelled coaster comprising:
    a. wheeled base means having rear and forward wheel means on the underside thereof;
    b. seat means spaced above and rigidly attached to said base means;
    c. the rear portion of said seat means being approximately forward of said rear wheel means and the forward portion of said seat means being rearward of the forward wheel means;
    d. upright rigid handle means extending above said seat means rigidly attached to the front of said seat means and to said base means rearward of said forward wheel means.

2. Coaster of claim 1 wherein said rear and forward wheel means each comprise a pair of swivel wheels.

3. Coaster of claim 1 wherein said seat means is rigidly attached to said base means by two vertical members with openings therein spaced apart to provide a semi-enclosed storage space with access thereto from the rear and sides of the coaster.

4. Coaster of claim 1 wherein said handle means is adapted to serve as a back rest for an occupant seated facing rearward on said coaster.

5. Coaster of claim 4 wherein said handle means has a generally concave horizontal upper member adapted to receive the back of an occupant seated facing rearward on said coaster.

6. Coaster of claim 4 wherein the portion of said base means extending beyond the rear portion of said seat means is adapted to serve as a foot rest for an occupant seated facing rearward on said coaster.

* * * * *